United States Patent [19]

Blanding

[11] 4,081,848
[45] Mar. 28, 1978

[54] HEAD CARRIER PROVIDING INDEPENDENT PROTRUSION ADJUSTMENT

[75] Inventor: Douglass Lane Blanding, Leroy, N.Y.

[73] Assignee: Eastman Kodak Company, Rochester, N.Y.

[21] Appl. No.: 679,258

[22] Filed: Apr. 22, 1976

[51] Int. Cl.² .................... G11B 5/58; G11B 21/24
[52] U.S. Cl. ............................................. 360/109
[58] Field of Search ............................ 360/109, 104

[56] References Cited

U.S. PATENT DOCUMENTS

| | | | |
|---|---|---|---|
| 3,286,041 | 11/1966 | Nishiwaki | 360/109 |
| 3,422,230 | 1/1969 | Tanigawa et al. | 360/109 |
| 3,670,113 | 6/1972 | Bragas | 360/109 |

*Primary Examiner*—Robert S. Tupper
*Attorney, Agent, or Firm*—Thomas H. Close

[57] ABSTRACT

A carrier for mounting a pair of magnetic heads to a rotatable head drum section of a helical-scan magnetic tape unit includes two head mounting pads held in a spaced-apart relationship by one or more C-shaped flexible connecting sections. The pads preferably have opposed edges which are arranged to define a reference direction perpendicular to the axis between the head gaps (head pair axis). With this configuration, head protrusion may be independently adjusted by flexing the C-shaped section and, using such opposed edges for reference, dihedral correction (to align the head pair axis with the drum rotary axis) may be made without disturbing head protrusion.

7 Claims, 8 Drawing Figures

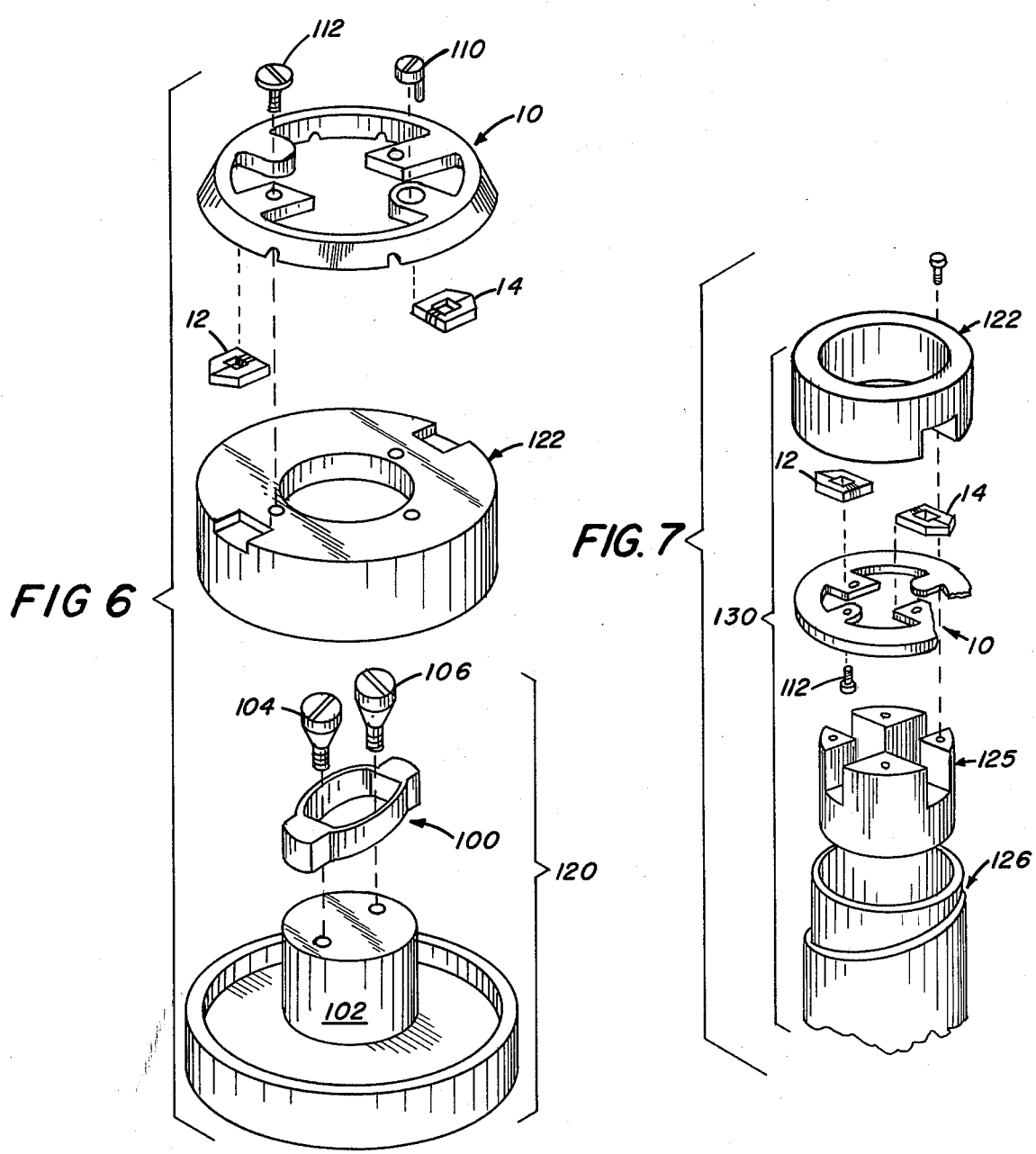

HEAD CARRIER PROVIDING INDEPENDENT PROTRUSION ADJUSTMENT

BACKGROUND OF THE INVENTION

1. Field of the Invention

The invention relates to carriers for attaching a pair of magnetic heads to a rotatable head drum section of a helical scan magnetic tape unit.

2. Description Relative to the Prior Art

For high density video recording, helical tape scanning is frequently employed. In such helical-scan systems magnetic heads located on respective opposite sides of a rotatable drum section typically cooperate in pairs, on an alternating basis, in swiping across the tape to effect the overall tape scanning pattern. With this arrangement, various alignments for a head pair become critical if the recorded signal is to be "laid down" and reproduced faithfully.

For most recording systems, it is important that the heads of a head pair trace the same circle, with such heads, moreover, both being located on the same diameter of that circle. To this end, it is necessary to assure that the heads rotate in substantially the same plane (coplanarity alignment) and that the axis which extends between the head gaps is located on a diameter of the rotatable drum section (dihedral alignment).

The distance between the head tips, i.e., the diameter of the circle traced thereby, defines the protrusion of the heads beyond the rotatable drum section and represents another important alignment characteristic. The importance of head protrusion results because protrusion influences head-to-tape pressure which in turn influences head response and head water. To keep head wear low, that degree of protrusion producing the lowest head-to-tape pressure consistent with good head response is desirably maintained. Accordingly, in various situations, it may prove desirable to adjust head protrusion and, hence, the diameter of the circle traced by the heads: For example, during initial factory installation, an accurate protrusion adjustment is generally performed. Moreover, a changeover to tape having a different magnetic and/or stiffness characteristic may make a change of protrusion desirable or necessary to achieve good head response. It may also be necessary to change protrusion to compensate for head wear (in this regard, see U.S. Pat. No. 3,076,060 which describes a rather elaborate apparatus for continuous automatic adjustment of protrusion for a magnetic head).

For alignment convenience, the protrusion adjustments, as well as the dihedral and coplanarity adjustments, are desirably independent, i.e., do not influence each other. Unfortunately, the simplest way to arrange heads on a drum section, i.e., by separate fastening of each head in place, offers little independence in the alignment procedure.

Various arrangements utilizing specialized carriers for individual heads have been proposed for facilitating head adjustment, e.g., U.S. Pat. Nos. 3,207,517; 3,319,015; 3,679,838; and 3,882,543.

U.S. Pat. No. 3,422,230 describes a carrier arrangement for pairs of heads, but this arrangement apparently requires precise mating parts if correct dihedral and protrusion alignments are to be achieved without repositioning the individual heads.

What appears to be lacking in the prior art is an easily fabricated and aligned head mounting arrangement, particularly such an arrangement which provides for independent adjustments to the three basic head pair alignments.

SUMMARY OF THE INVENTION

In copending United States Patent Application Ser. No. 621,937, filed Oct. 14, 1975, a carrier element for supporting a pair of magnetic heads in an opposed arrangement is described which provides for independent adjustment of the axis extending between the centers of the head gaps to coincide with a diameter of a rotatable drum section, i.e., dihedral error correction, without repositioning the individual heads on such carrier. The present invention recognizes that, in many situations, considerations such as head wear or differences in tape characteristics or initial alignment convenience cause provision for independent adjustment of head protrusion, without repositioning the individual heads on the carrier, to also be desirable and teaches, inter alia, how the heads may be positioned along the head pair axis (the axis extending between the head gaps) without shifting that axis.

Such independent protrusion adjustment is made possible, according to the invention, by utilizing a head carrier element having at least one generally C-shaped flexible section which serves to retain, in spaced-apart relationship, two head mounting pads, such pads being located at respective ends of such flexible section(s). With this arrangement, it is possible, by applying radially directed forces at the pads to stress the flexible section and, in doing so, displace the heads along the head axis to effect protrusion adjustment.

If, additionally, the pads themselves are provided with inner edges, or portions thereof, defining a reference direction perpendicular to the head pair axis, these edges may be utilized to guide movement of the overall carrier element to permit independent dihedral alignment.

Coplanarity, the third basic alignment, may also be facilitated with such carriers by utilizing head mounting pads with a flat mounting surface which is adapted to engage a reference surface of the rotatable drum section, such reference surface being perpendicular to the rotary axis of the drum section. Movement of the carrier over such reference surface, for example to adjust protrusion or dihedral error, with this flat type of pad, would not affect the plane of head rotation (i.e., will not disturb coplanarity).

In accordance with the foregoing, it will be appreciated that, with head carriers according to the invention, head alignment accuracy need not be "machined into" the head drum and/or carrier, but rather adjustments may be made conveniently, while mounting the head carrier to the drum section, with each of the basic alignments being essentially independent in the sense that adjustments thereto do not influence to a significant degree the other basic alignments.

The invention will now be described in detail with reference to the figures, wherein:

FIG. 6 is a perspective view showing an adjusting jig which is useful in adjusting head carriers according to the invention;

FIG. 7 is a perspective view showing a preferred head drum assembly utilizing carriers according to the invention.

It should be noted that some dimensions have been exaggerated in the figures for purposes of clarity of illustration; and that primes are used to distinguish elements which are essentially similar but do exhibit some differences for each other.

Figure 1:
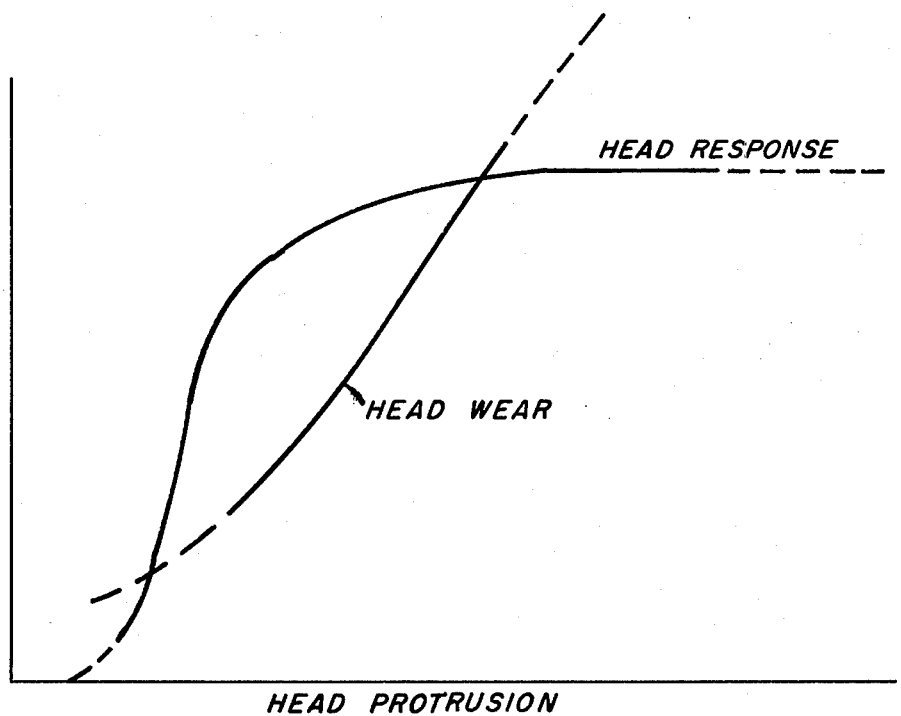
FIG. 1 is a graphical representation, which aids discussion of head response and head wear characteristics.

Referring to FIG. 1, the saturation effect in head response is indicated, which effect results as sufficiently intimate head-to-tape contact is achieved. Head wear, it will be appreciated, tends to increase as head-to-tape pressure increases. Assuming for the moment that tape tension has been preselected, it will be appreciated that there is a critical range of head protrusion for achieving good head response without undue head wear.

Figure 2:
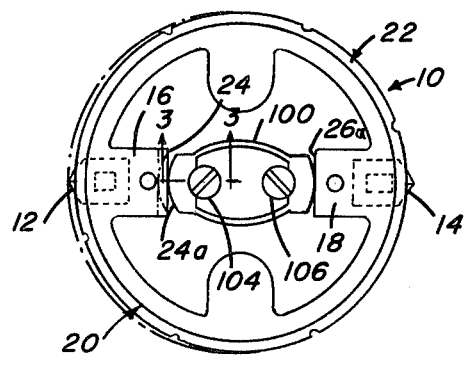
FIG. 2 is a plan view of a preferred head carrier according to the invention with dashed lines indicating protrusion adjustment.

Referring to FIG. 2, a presently preferred head carrier 10 according to the invention is intended for use in mounting a pair of magnetic heads (denoted 12 and 14) to a rotatable drum section (not shown), and includes two flat head pans 16 and 18 which are held in an opposed, spaced-apart relationship by a pair of C-shaped flexible sections 20 and 22. The C-shaped flexible sections 20 and 22 are arranged symmetrically on either side of pads 16 and 18, giving carrier 10 a generally ring-like appearance.

The tips of heads 12 and 14 project beyond carrier 10 and are arranged generally along the centerline through pads 16 and 18. Since, as will become more apparent below, head alignment may be achieved according to the invention without moving the individual heads on the carrier 10, the heads may, for example, be permanently fastened to the pads 16 and 18 using an adhesive. (The line or axis passing through the gaps of the fastened heads 12 and 14 is hereinafter referred to as the head pair axis and the distance between the tips of the heads as the "tip separation.")

With the described carrier arrangement, it is conveniently possible to expand or compress the carrier 10 along the head pair axis for purposes of adjusting tip separation as is indicated by dashed lines in FIG. 2. In so doing, advantage is taken of the flexure capabilities of the sections 20 and 22. This adjustment may, moreover, be performed without shifting the head pair axis and, hence, as will be discussed more fully below, independently of the dihedral alignment of the heads.

Figure 3:
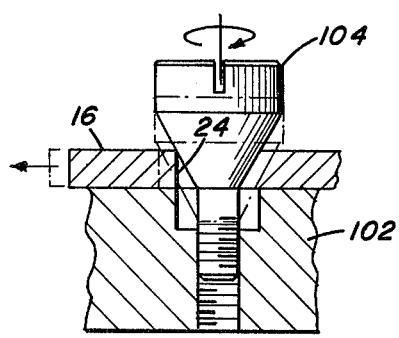
FIG. 3 is a partial cross-sectional view, taken along line 3—3 of FIG. 2, which emphasizes a tapered screw arrangement for adjusting protrusion.

To apply forces at pads 16 and 18 for gradually adjusting tip separation, means such as the expandable ring 100 may be utilized. The expandable ring cooperates with a jig post 102 and two tapered adjusting screws 104 and 106 for applying such forces (see also FIG. 3).

Figure 4:
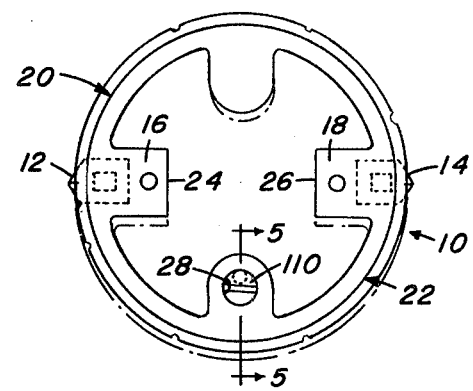
FIG. 4 is a plan view of a preferred head carrier with dashed lines indicating dihedral adjustment.
Figure 5:
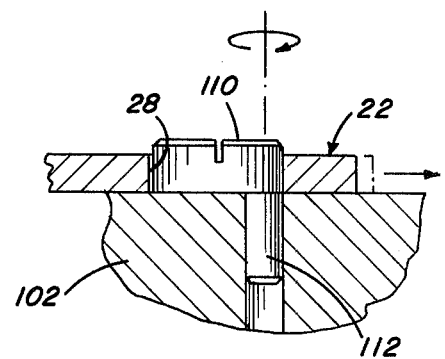
FIG. 5 is a partial cross-sectional view, taken along line 5—5 of FIG. 4, which emphasizes a cam pin arrangement for use in correcting dihedral error.

Referring to FIG. 4, the inner edges 24 and 26 of pads 16 and 18, respectively, are shaped to act as guide surfaces in a direction paralleling the plane of head rotation and perpendicular to the head pair axis. With such edges 24 and 26 acting as guides the head pair axis may be shifted without significantly changing the tip separation for heads 10 and 12. This independent shifting of the head pair axis is best achieved when reference surfaces 24a, 26a of ring 100 which abut the guide edges 24, 26 of pads 16 and 18 are of generally circular shape and, hence, establish a substantially uniform diametric separation distance, at least over operative portions thereof. To facilitate such adjustment which shifts the head pair axis, a camming bore 28 may be located on an extension situated toward the middle of one of the C-shaped flexible sections 20 or 22, which camming bore receives a cam pin 110. By rotating the cam pin 110, which has an offset shaft 112 (see also FIG. 5) for cooperating with the post 102, the head pair axis is gradually shifted while, by virtue of the cooperation of edges 24, 26 with ring 100 discussed above, no significant change in tip separation results.

Referring to FIG. 6, an adjusting jig 120 is adapted to use in mounting head carriers according to the invention to a rotatable drum section 122 of a type having a hollow central core. The post 102 of jig 120 extends into the hollow central core and supports the expandable ring 100 discussed above. A flat reference face 124 of the drum section 122 is arranged perpendicular to the rotary axis of such section and engages a flat surface of the head pads 16 and 18 to assure coplanarity of the heads 12 and 14. Dihedral adjustment is effected by turning the cam pin 110 and individual protrusion adjustments are made by turning screw 104 or 106. Once these alignment operations have been performed a pair of clamping screws 112 (only one is shown) is tightened to hold the heads in fixed relationship to drum section 122.

Referring to FIG. 7, a head drum arrangement 130 incorporates the presently preferred implementation of the invention. The carrier 10 is mounted to rotatable drum section 122 which is connected to a shaft 125. The shaft 125 passes through a stationary drum section 126 and is rotated by suitable drive means known in the art (not shown).

Figure 8:
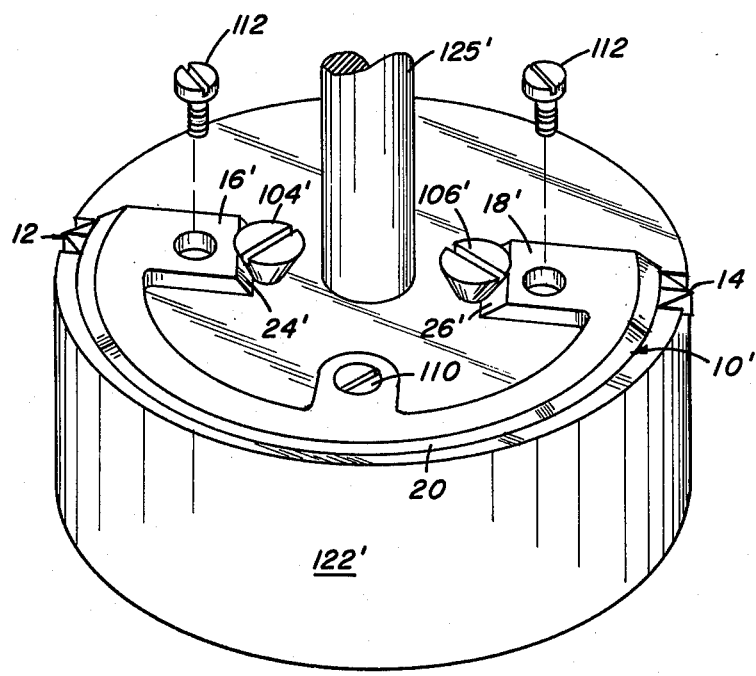
FIG. 8 is a plan view of an alternative head carrier according to the invention.

Referring now to FIG. 8, there is shown an alternative carrier 10' for implementing the invention. Only one C-shaped flexible section 20 is employed to connect flat head pads 16' and 18' and hold them in spaced-apart relationship. With this arrangement, head pads 16' and 18' may be forced together or apart to effect protrusion adjustment for example, using a pair of tapered adjusting screws 104' and 106'. Such adjustment, when only a single C-shaped flexible section is used, is not purely along the head pair axis but rather each of pads 16' and 18' follows an individual curved path. While such curved motion is not as desirable as motion along the head pair axis the departure is sufficiently small, in most cases, that the alternative carrier 10' provides satisfactory protrusion adjustment. As discussed above, with regard to the preferred implementation, guide edges are provided to facilitate dihedral adjustment without significantly influencing head protrusion. A pair of opposed edges 24' and 26' serve as the guide edges and are slanted relative to the head pair axis to facilitate cooperation with the tapered adjusting screws 104' and 106' in correcting head protrusion. Edges 24' and 26' are aligned to slide along screws 104' and 106' in a direction perpendicular to the head pair axis to correct for dihedral error. Gradual adjustment of this type is facilitated by a cam pin 110 which operates as described with reference to FIG. 5.

The invention has been described in detail with particular reference to preferred forms thereof but it will be understood that variations and modifications within the spirit and scope of the invention will be suggested to those skilled in the art.

What is claimed is:

1. For attaching a pair of magnetic heads to a rotatable drum section, a carrier element comprising:
   first and second substantially planar head mounting pads each of which has a surface adapted to receive a respective head of such a head pair;
   at least one flexible C-shaped section rigidly connected at each end to a respective one of said pads, said pads being arranged in a spaced-apart relationship, for defining a space therebetween to permit adjustment movements along a reference line extending between centers thereof, without significantly shifting that line, by flexing said C-shaped sections and changing the degree of curvature thereof.

2. A carrier element according to claim 1 wherein said pads have opposed edges which are in parallel alignment to guide movement of the carrier in a direction perpendicular to said reference line for purposes of dihedral correction.

3. A carrier element according to claim 2 wherein two flexible C-shaped sections of similar shape are utilized, such sections being arranged symmetrically on each side of said reference line and in a plane with said pads so as to produce a generally circular carrier configuration.

4. A carrier for mounting a pair of magnetic heads to a drum section comprising:
   a pair of mounting pads, each of which is adapted to receive one head of such a head pair;
   a first flexible C-shaped section which is rigidly attached at each tip to a respective pad of said pair of pads, said pads being in a spaced-apart relationship to define a space therebetween; and
   a second flexible C-shaped section arranged opposite said dirst C-shaped section to produce a generally symmetrical ringlike configuration, said second section being rigidly attached at each tip thereof to a respective pad of said pair of pads, whereby the distance separating said pads is adjustable by flexing said first and second sections to change the degree of curvature thereof.

5. A carrier according to claim 1 wherein said flexible C-shaped sections and said pads lie in substantially the same plane.

6. A head carrier unit for attachment to a face of a rotatable head drum section comprising:
   a pair of pads, each of which has a magnetic head rigidly attached to a surface thereof;
   at least one flexible C-shaped section connected to a respective one of said pads at each section end, and arranged to hold said pads in a spaced-apart relationship, to define a space therebetween so that the distance between said pads is adjustable by flexing said C-shaped section(s) to change the degree of curvature thereof;
   and means for adjustably fastening said pads to said face of the drum section.

7. A carrier according to claim 6 wherein said pads have opposed edges which reference a direction perpendicular to an axis passing generally through the centers of both said heads and wherein cam receiving means is located centrally of one C-shaped section for transmitting adjustment motion relative to said rotatable drum section having a component in said direction.

* * * * *